United States Patent Office 3,137,712
Patented June 16, 1964

---

3,137,712
16α-CHLORO-1,4-PREGNADIENES
Robert D. Birkenmeyer, Fred Kagan, and Barney J. Magerlein, Kalamazoo, and William P. Schneider, Kalamazoo Township, Kalamazoo County, Mich., assignors to The Upjohn Company, Kalamazoo, Mich., a corporation of Delaware
No Drawing. Filed Oct. 13, 1961, Ser. No. 144,830
9 Claims. (Cl. 260—397.45)

This invention relates to novel 16α-chloro steroids and novel steroid intermediates and methods used in the preparation thereof.

The novel 16α-chloro-11β-hydroxy steroid compounds of this invention are represented by the formula:

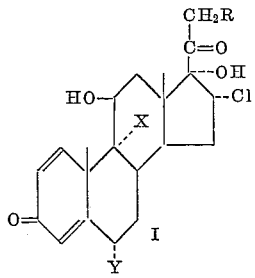

wherein R is selected from the group consisting of hydrogen, hydroxyl, OAcyl, and —OPO$_3$H$_2$, the term Acyl representing the acyl radical of an organic carboxylic acid, particularly a hydrocarbon carboxylic acid containing from 1 to 12 carbon atoms, inclusive; X is selected from the group consisting of hydrogen and fluorine, and Y is selected from the group consisting of hydrogen, methyl and fluorine. Also of interest are the 17-esters, particularly the 17-acetates, of those compounds of Formula I wherein R is hydrogen.

The compounds of Formula I possess useful therapeutic properties, namely anti-inflammatory and glucocorticoid activity. Thus, for example, 9α-fluoro-16α-chloro-11β,17α,21 - trihydroxy-1,4-pregnadiene-3,20-dione 21-acetate (9α-fluoro-16α-chloro-prednisolone 21-acetate) has been found to exhibit approximately 360 times the glucocorticoid activity of hydrocortisone, approximately 313 times the anti-inflammatory activity of hydrocortisone, and in addition has a favorable effect on salt and water balance.

The high activity of 9α-flouoro-16α-chloroprednisolone 21-acetate is the more surprising as other 16-substituted compounds have considerably lower activity (cf. Table I):

TABLE I

| Compound | Anti-Inflammatory Activity | Gluco-Corticoid Activity | Ratio of Anti-Inflam. Activity |
|---|---|---|---|
| 9α-fluoroprednisolone 21-acetate | 16.5 | 50 | 1 |
| 16α-methyl-9α-fluoroprednisolone 21 acetate | 137 | 385 | 8.3 |
| 16α-fluoro-9α-fluoroprednisolone 21-acetate | 77 | 60 | 4.7 |
| 16α-chloro-9α-fluoroprednisolone | 313 | 360 | 19 |

The compounds of Formula I are useful in the treatment of inflammatory conditions of mammals and birds and are particularly useful in the treatment of inflammatory conditions of the skin, eyes and ears of humans and of valuable domestic animals, as well as contact dermatitis and other allergic reactions.

Administration of the novel steroids of Formula I can be in conventional dosage forms, such as pills, tablets, capsules, syrups, or elixirs for oral use, or in liquid forms which are adaptable to synthetic cortical steroid hormones for injectable products. The novel compounds of Formula I can also be administered topically in the form of ointments, creams, lotions, and the like, with or without coacting antibiotics, germicides or other materials forming advantageous combinations therewith.

This invention also relates to the 11-keto compounds, otherwise corresponding to the compounds of Formula I.

The novel compounds of this invention such as,

11β,17α,21-trihydroxy-16α-chloro-1,4-pregnadiene-3,20-dione,
9α-fluoro-11β,17α,21-trihydroxy-16α-chloro-1,4-pregnadiene-3,20-dione,
6α-fluoro-11β,17α,21-trihydroxy-16α-chloro-1,4-pregnadiene-3,20-dione,
6α,9α-difluoro-11β,17α,21-trihydroxy-16α-chloro-1,4-pregnadiene-3,20-dione,
6α-methyl-11β,17α,21-trihydroxy-16α-chloro-1,4-pregnadiene-3,20-dione,
6α-methyl-9α-fluoro-11β,17α,21-trihydroxy-16α-chloro-1,4-pregnadiene-3,20-dione, and the 21acylates thereof;
11β,17α-dihydroxy-16α-chloro-1,4-pregnadiene-3,20-dione,
9α-fluoro-11β,17α-dihydroxy-16α-chloro-1,4-pregnadiene-3,20-dione,
6α-fluoro-11β,17α-dihydroxy-16α-chloro-1,4-pregnadiene-3,20-dione,
6α,9α-difluoro-11β,17α-dihydroxy-16α-chloro-1,4-pregnadiene-3,20-dione,
6α-methyl-11β,17α-dihydroxy-16α-chloro-1,4-pregnadiene-3,20-dione,
6α-methyl-9α-fluoro-16α-chloro-11β,17α-dihydroxy-1,4-pregnadiene-3,20-dione, and the 17-acylates thereof;
11β,17α,21-trihydroxy-16α-chloro-1,4-pregnadiene-3,20-dione 21-phosphate,
9α-fluoro-11β,17α,21-trihydroxy-16α-chloro-1,4-pregnadiene-3,20-dione 21-phosphate,
6α-fluoro-11β,17α,21-trihydroxy-16α-chloro-1,4-pregnadiene-3,20-dione 21-phosphate,
6α,9α-difluoro-11β,17α,21-trihydroxy-16α-chloro-1,4-pregnadiene-3,20-dione 21-phosphate,
6α-methyl-11β,17α,21-trihydroxy-16α-chloro-1,4-pregnadiene-3,20-dione 21-phosphate,
6α-methyl-9α-fluoro-11β,17α,21-trihydroxy-16α-chloro-1,4-pregnadiene-3,20-dione 21-phosphate, are prepared according to the following reaction scheme:

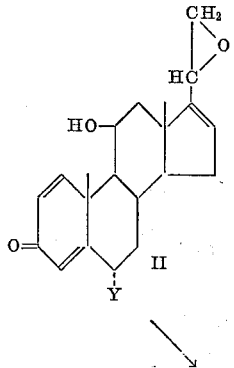

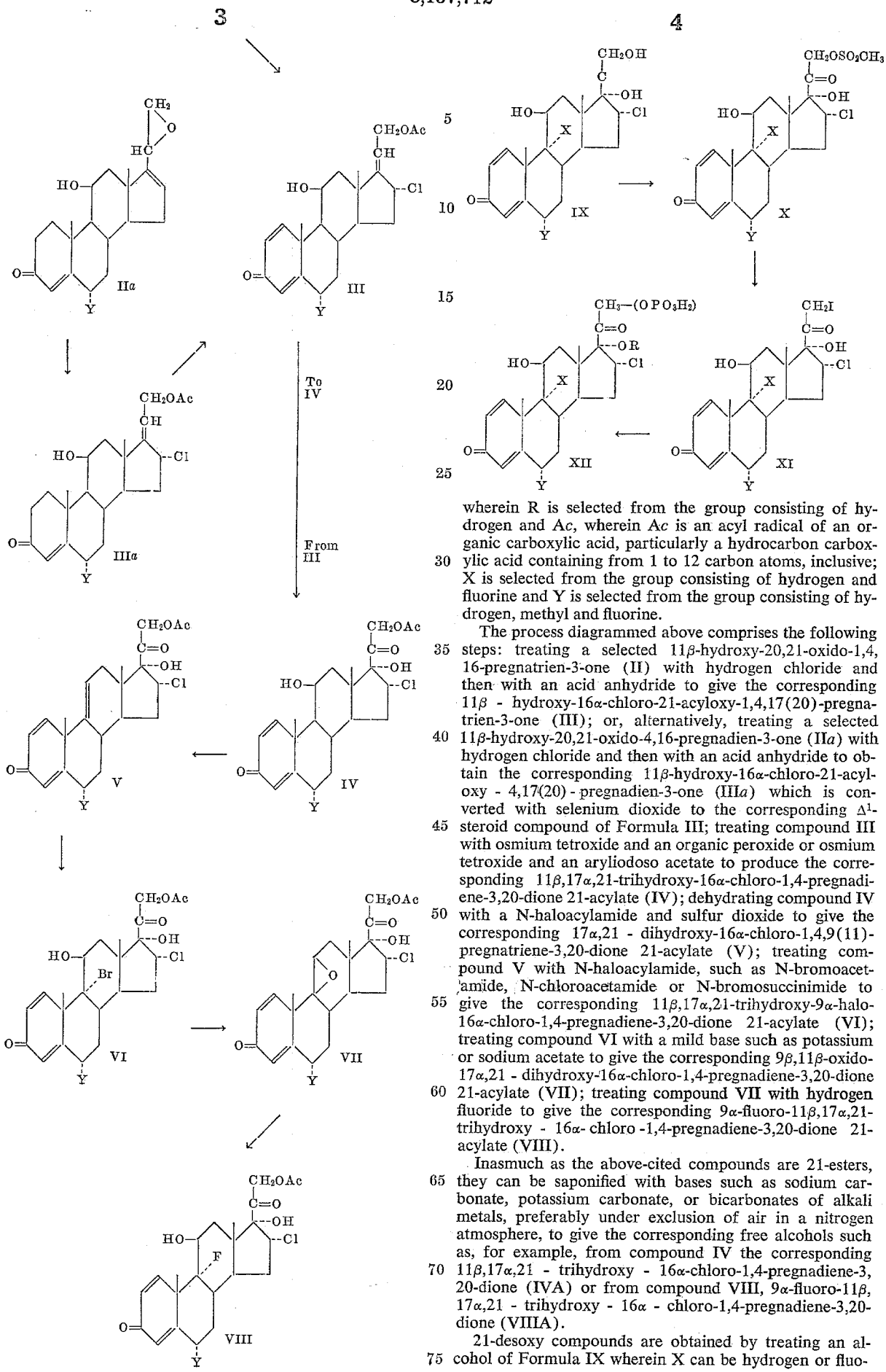

wherein R is selected from the group consisting of hydrogen and Ac, wherein Ac is an acyl radical of an organic carboxylic acid, particularly a hydrocarbon carboxylic acid containing from 1 to 12 carbon atoms, inclusive; X is selected from the group consisting of hydrogen and fluorine and Y is selected from the group consisting of hydrogen, methyl and fluorine.

The process diagrammed above comprises the following steps: treating a selected 11β-hydroxy-20,21-oxido-1,4,16-pregnatrien-3-one (II) with hydrogen chloride and then with an acid anhydride to give the corresponding 11β - hydroxy-16α-chloro-21-acyloxy-1,4,17(20)-pregnatrien-3-one (III); or, alternatively, treating a selected 11β-hydroxy-20,21-oxido-4,16-pregnadien-3-one (IIa) with hydrogen chloride and then with an acid anhydride to obtain the corresponding 11β-hydroxy-16α-chloro-21-acyloxy - 4,17(20) - pregnadien-3-one (IIIa) which is converted with selenium dioxide to the corresponding Δ¹-steroid compound of Formula III; treating compound III with osmium tetroxide and an organic peroxide or osmium tetroxide and an aryliodoso acetate to produce the corresponding 11β,17α,21-trihydroxy-16α-chloro-1,4-pregnadiene-3,20-dione 21-acylate (IV); dehydrating compound IV with a N-haloacylamide and sulfur dioxide to give the corresponding 17α,21 - dihydroxy-16α-chloro-1,4,9(11)-pregnatriene-3,20-dione 21-acylate (V); treating compound V with N-haloacylamide, such as N-bromoacetamide, N-chloroacetamide or N-bromosuccinimide to give the corresponding 11β,17α,21-trihydroxy-9α-halo-16α-chloro-1,4-pregnadiene-3,20-dione 21-acylate (VI); treating compound VI with a mild base such as potassium or sodium acetate to give the corresponding 9β,11β-oxido-17α,21 - dihydroxy-16α-chloro-1,4-pregnadiene-3,20-dione 21-acylate (VII); treating compound VII with hydrogen fluoride to give the corresponding 9α-fluoro-11β,17α,21-trihydroxy - 16α- chloro -1,4-pregnadiene-3,20-dione 21-acylate (VIII).

Inasmuch as the above-cited compounds are 21-esters, they can be saponified with bases such as sodium carbonate, potassium carbonate, or bicarbonates of alkali metals, preferably under exclusion of air in a nitrogen atmosphere, to give the corresponding free alcohols such as, for example, from compound IV the corresponding 11β,17α,21 - trihydroxy - 16α-chloro-1,4-pregnadiene-3,20-dione (IVA) or from compound VIII, 9α-fluoro-11β,17α,21 - trihydroxy - 16α - chloro-1,4-pregnadiene-3,20-dione (VIIIA).

21-desoxy compounds are obtained by treating an alcohol of Formula IX wherein X can be hydrogen or fluorine and Y can by hydrogen, methyl or fluorine with an organic sulfonyl chloride such as methane-, ethane-, or propanesulfonyl chloride, p-toluenesulfonyl chloride or benzenesulfonyl chloride, and so on to give the corresponding 21-ester (X); treating compound X with an alkali iodide in acetone results in the corresponding 11β,17α - dihydroxy-16α-chloro-21-iodo-1,4-pregnadiene-3,20-dione (XI); treating compound XI with a reducing agent such as alkali thiosulfates, sodium sulfite, sodium bisulfite, other alkali thiosulfates and sulfites or zinc and acetic acid gives the corresponding 11β,17α-dihydroxy-16α-chloro-1,4-pregnadiene-3,20-dione (XII).

The introduction of the 16α-chloro group into a steroid can also be made by the following alternative step: treating with thionyl chloride or phosphorus trichloride an 11β,16,21 - trihydroxy-1,4,17(20)-pregnatriene-21-acylate (XIII), as shown below:

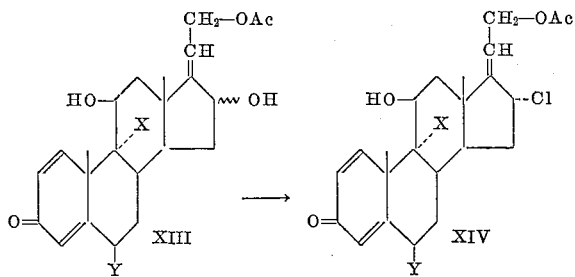

The starting materials of these syntheses are prepared by the method described by Magerlein, Birkenmeyer and Kagan in J. Am. Chem. Soc., 82, 1252 (1960). Further details for the synthesis of other starting materials are given under preparations.

In carrying out the process of the present invention, the selected 11β-hydroxy-20,21-oxido-1,4,16-pregnatrien-3-one, dissolved in a suitable organic solvent such as methylene chloride, ethylene chloride, chloroform, and the like is reacted with gaseous hydrogen chloride. The temperature of the reaction is preferably between 0 and 15° but temperatures from −80 to +25° C. are operative. Depending on the temperature and solvent chosen, the time of reaction may last between half an hour and 24 hours or longer. In the preferred embodiment of this invention the steroid, dissolved in the solvent such as methylene chloride, ethylene chloride, and the like is added to a cooled solution of hydrogen chloride in a similar solvent plus some tetrahydrofuran. The mixture is then allowed to stand from ½ to 24 hours at temperatures between 0 and 15° C.

The thus-obtained reaction mixture is distilled under vacuum to remove excess hydrogen chloride and solvents and the thus-obtained residue without further purification is redissolved in pyridine. To the pyridine solution an acid anhydride is added such as acetic anhydride, propionic anhydride, or benzoic anhydride and the like and the mixture allowed to stand at room temperature or any temperature between 0 and 40° for several hours or more; preferably over night.

After this period, the mixture is poured into water and extracted with chloroform, methylene chloride or the like to recover the thus-obtained 11β-hydroxy-16α-chloro-21-acyloxy-1,4,17(20)-pregnatrien-3-one 21-acylate.

The thus-obtained product can be purified by any conventional method such as chromatography, recrystallization from organic solvents such as ether, methanol, ethanol, methylene chloride, ethylene chloride and the like to give the pure, desired 11β,21-dihydroxy-16α-chloro-1,4,17(20)-pregnatrien-3-one 21-acylate (III).

The thus-obtained compound III is submitted to an oxidative hydroxylation reaction with osmium tetroxide in the presence of an oxygenating agent such as hydrogen peroxide, organic peracid, alkyl peroxide, amine oxide peroxide, organic polyvalent iodooxide, such as iodoxybenzene, aryliodoso compounds, for example iodosobenzene, phenyliodoso acetate and the like. The reaction is best carried out in a solvent such as tertiary butyl alcohol at temperatures between 0 and 45° C. and as described in great detail in U.S. Patents 2,769,825, 2,769,823, and 2,875,217. The thus-obtained 11β,17α,21-trihydroxy-16α-chloro-1,4-pregnadiene-3,20-dione 21-acetate (IV), is purified by standard methods such as solvent extraction, chromatography, and recrystallization or a combination thereof using solvents such as methylene chloride, acetone, methanol, Skellysolve B hexane, and the like.

The thus-obtained ester of configuration IV can be saponified by a method well known in the art such as by the use of sodium or potassium hydroxide, carbonate or bicarbonate, calcium hydroxide, barium hydroxide and the like in alcoholic solutions, preferably under exclusion of air, in a nitrogen atmosphere, at low temperatures between 0 and 30°. In this manner the free alcohol, 11β,17α,21 - trihydroxy - 16α - chloro - 1,4 - pregnadiene-3,20-dione, is obtained which if desired can be reesterified with acid anhydrides, acid chlorides, and acid bromides, or organic acids in the presence of a catalyst such as toluenesulfonic acid in conventional manner.

The dehydration of compound IV can be carried out by any methods known in the arts, for example by dehydrating agents such as phosphorus oxychloride, hydrochloric acid or sulfuric acid or acetic acid. In the preferred method the dehydration is effected by reacting the 11β-hydroxy compound with an acid N-haloamide or N-haloimide in a base and treating the thus-produced intermediate with dry sulfur dioxide in an organic base. As reagents for producing the intermediate noted above, the acid N-haloamides or N-haloimides are used wherein the halogen has an atomic number from 17 to 53, inclusive, preferably chlorine or bromine. Examples of such reagents are N - chloroacetamide, N - bromoacetamide, N-chlorosuccinimide, N-bromosuccinimide, N-iodosuccinimide, 3-bromo-5,5-dimethylhydantoin and 1,3-dibromo-5,5-dimethylhydantoin. Ordinarily an amount in excess of a molar equivalent, calculated on the starting 11β-hydroxy steroid, is employed. As solvents, pyridines such as pyridine, alkyl-pyridine, picoline, lutidine, collidine, parvuline or the like or lower fatty acid amides such as formamide and dimethylformamide are used. The dehydration reaction is generally conducted under anhydrous conditions, preferably at a concentration of less than 0.1 molar equivalent of water calculated per mole of steroid. Large proportions of water decrease the yield. Ordinarily, room temperature (20 to 30° C.) is preferred and a reaction period between five minutes to three hours is usually employed. The reaction mixture, preferably at a temperature of between 20 and 30° C., is then treated with anhydrous sulfur dioxide in the presence of an organic base such as the before-mentioned pyridine or acid amides. This reaction may be carried out at temperatures between −40 and +70° C. The reaction mixture, after saturation with sulfur dioxide, is poured into water, the crude product extracted, and if desired purified by chromatography or recrystallization to give pure 17α,21-dihydroxy-16α-chloro-1,4,9(11)-pregnatriene-3,20-dione 21-acylate (V).

The thus-obtained compound V is treated with hypohalous acid such as hypochlorous or hypobromous acid. The hypohalous acid is usually prepared by reacting an acid N-haloamide or an N-haloimide with an acid to produce the hypohalous acid in situ. In the preferred embodiment of the invention, compound V is dissolved in an organic solvent such as methylene chloride, tertiary butyl alcohol, dioxane, tertiary amyl alcohol, ethylene dichloride, or the like and reacted at room temperature with the hypobromous or hypochlorous acid releasing agent in the presence of an acid. Such hypohalous acid releasing agents include the N-bromoacetamide, N-chloroacetamide, N-bromosuccinimide, N-iodosuccinimide, and the like in the presence of water and an acid such as perchloric acid, dilute sulfuric acid, or the like. The reaction can be carried out at temperatures between 15 and 35° C.; however, lower or higher tempertaures are operative for the process. The reaction period is rather short and may vary between 4 to 5 minutes to 1 hour. At the end of the reaction time excess of hypohalous acid is destroyed by the addition of sodium sulfite or other sulfites or hydrosulfites. The materials thus obtained, $9\alpha$-iodo- or $9\alpha$-chloro- or $9\alpha$-bromo-$16\alpha$-chloro-$11\beta,17\alpha,21$-trihydroxy-1,4-pregnadiene-3,20-dione 21-acylate (VI) can be recovered by concentrating the mixture under reduced pressure, diluting with water and collecting the solid precipitate. Product VI can also be recovered by extraction from the reaction mixture by conventional extractions, with water-immiscible solvents, such as ether, Skellysolve B hexanes, methylene chloride, and the like. If desired, the product can be purified by chromatography and recrystallization in known manner, but for the purpose of the subsequent reaction, the crude material is usually employed.

Cyclization of compound VI is obtained by treating this compound at an elevated temperature with a mild base. Bases useful for this purpose are anhydrous potassium acetate, sodium or potassium bicarbonate, sodium acetate, or the like with potassium acetate preferred. The reaction is carried out in a solvent such as methanol, ethanol, acetone, tertiary butyl alcohol, or the like. The reaction time is usually between ½ hour and 24 hours. The product, $9\beta,11\beta$-oxido-$16\alpha$-chloro-$17\alpha$, 21-dihydroxy-1,4-pregnadiene-3,20-dione 21-acylate (VII), is recovered by conventional means such as removing the solvent by evaporating the reaction mixtures, preferably in vacuo, and extracting the residue with a water-immiscible organic solvent such as methylene chloride, ethylene dichloride, ether, and the like. The extracts are concentrated and if desired may be purified by chromatography or be reduced to dryness and the crude material, thus obtained, used for the subsequent steps.

The thus-obtained compound VII, $9\beta,11\beta$-oxido-$16\alpha$-chloro-$17\alpha,21$-dihydroxy-1,4-pregnadiene-3,20 - dione 21-acylate, is thereupon reacted with hydrogen fluoride. The reaction may be performed with aqueous 48% hydrogen fluoride or preferably with anhydrous hydrogen fluoride, cooled to about $-60$ to $-80°$ C. As solvent, tetrahydrofuran and methylene dichloride are preferred. The mixtures are preferably stirred for 1 to 48 hours at low temperatures such as $-70$ to $+15°$. Thereafter, the reaction mixture is poured into a solution of an alkali carbonate such as sodium carbonate, potassium carbonate, or bicarbonate thereof to be neutralized. The product is obtained by extraction with water-immiscible organic solvents such as methylene chloride, ether, benzene, and the like. The extract may be purified by chromatography or the product may be obtained by evaporating the extracts, and recrystallizing the thus-obtained solid residue. The product thus obtained is $9\alpha$-fluoro-$11\beta,17\alpha,21$-trihydroxy-$16\alpha$-chloro-1,4-pregnadiene-3,20-dione 21 - acylate (VIII).

From compound VIII the free alcohol, $9\alpha$-fluoro-$11\beta,17\alpha,21$-trihydroxy-$16\alpha$-chloro-1,4-pregnadiene-3,20 - dione (VIIIA), can be obtained by submitting the ester (VIII) to saponification as described with compound IV. The free alcohol VIIIA can be reesterified in known manner to give other esters having from 1 to 12 carbon atoms in the ester group.

In order to prepare the 21-desoxy compounds, it is necessary to use as starting material the free steroid alcohols which are generically indicated in the earlier shown flow sheet as compound IX. The compound of structure IX is treated with a halide of an organic sulfonic acid, such as the chloride or bromide of methanesulfonic acid, ethanesulfonic acid, propanesulfonic acid, $\alpha$-or $\beta$-naphthalenesulfonic acid, p-toluenesulfonic acid, benzenesulfonic acid, or the like, with methanesulfonic acid halides, especially methanesulfonyl chloride preferred. In the preferred embodiment of this invention compound IX is reacted with the alkyl- or arylsulfonyl halide, in solution in a solvent, such as for example, pyridine, benzene, toluene, or the like, at a temperature between $-10$ and $+30°$ C., providing that at the lower temperature the reaction mixture has not solidified. The use of pyridine as solvent and a temperature between $-10$ and $+10°$ C. is preferred. The time of reaction is between 30 minutes and 24 hours, after which the product, a $16\alpha$-chloro-$11\beta,17\alpha,21$-trihydroxy-1,4-pregnadiene-3,20-dione 21-organic sulfonate (X), is recovered from the reaction mixture in conventional manner, for example, by evaporating the solvent until a dry residue is obtained, precipitating the product by addition of water, or by extracting the material from an aqueous solution. For the extraction, solvents such as methylene chloride, chloroform, carbon tetrachloride, benzene, ether, toluene, or the like may be used. Removing the extraction solvent by distillation leaves the crude $11\beta,17\alpha,21$-trihydroxy - $16\alpha$ - chloro-1,4-pregnadiene-3,20-dione 21-organic sulfonate (X).

Treating compound X with sodium or potassium iodide in acetone solution gives the corresponding $11\beta,17\alpha$-dihydroxy-$16\alpha$-chloro-21-iodo-1,4 - pregnadiene - 3,20 - dione (XI). The reaction is usually carried out with an excess of sodium or potassium iodide, three to twenty moles of the alkali metal iodide per mole of steroid. The temperature is usually the refluxing temperature of the acetone solution and the time for the reaction is from 3 to 4 minutes to a half hour. Evaporating the solvents leaves the desired $11\beta,17\alpha$-dihydroxy-$16\alpha$-chloro-21-iodo-1,4-pregnadiene-3,20-dione (XI).

Compound XI is thereupon reacted with a reducing agent such as sodium or potassium thiosulfate, sodium bisulfite, or the like. In the preferred embodiment of the invention, compound XI is slurried in acetic acid, and thereto is added the aqueous solution of sodium or potassium thiosulfate, bisulfite, or the like. The mixture is then stirred at room temperature for a period of 10 minutes to 2 hours and the product is isolated from the reaction mixture by conventional methods such as filtration or extraction with a water-immiscible organic solvent such as ether, benzene, methylene chloride, ethylene chloride, chloroform, hexane, heptane, or the like, and evaporation of the extracts. Purification of the thus obtained $11\beta,17\alpha$-dihydroxy - $16\alpha$-chloro-1,4-pregnadiene-3,20 - dione (XII) is carried out by conventional means such as recrystallization or chromatography.

The thus-obtained $11\beta,17\alpha$-dihydroxy-$16\alpha$-chloro-1,4-pregnadiene-3,20-dione (XII) can be selectively esterified with an acid anhydride in acetic acid solution and in the presence of an acid catalyst such as para-toluenesulfonic acid. The esterification is carried out usually at room temperature in a nitrogen atmosphere for several hours. The thus-obtained ester of compound XII, the $11\beta,17\alpha$-dihydroxy-$16\alpha$-chloro1,4-pregnadiene-3,20-dione 17-acylate, is recovered from the reaction mixture by pouring the reaction mixture into water and separating the precipitated material or, alternatively, by extracting the product with water-immiscible solvents such as benzene, ether, methylene chloride, ethylene chloride, and the like. The material thus obtained is purified through recrystallization or chromatography to give pure esters.

PREPARATION 1

$6\alpha$-Fluoro-$11\beta,21$-Dihydroxy-1,4,17(20)-Pregnatrien-3-One

Five 100-ml. portions of a medium, containing 1% glucose, 2% corn steep liquor (60% solids) and tap water, in 250-ml. Erlenmeyer flasks, are adjusted to a pH of 4.9. This medium is sterilized for 45 minutes at 15 pounds per square inch pressure and inoculated with a 1- to 2-day vegetative growth of *Septomyxa affinis* A.T.C.C. 6737. The Erlenmeyer flasks are shaken at room temperature (about 26 to 28° C.) for a period of 3 days. At the end of this period this 500-ml. volume is used as an inoculum for 10 l. of the same glucose-corn steep liquor medium which in addition contains 5 ml. of an antifoam compound (a mixture of lard oil and octadecanol). The fermentor is placed into a water-bath, adjusted to 28° C. and the contents stirred thoroughly (300 r.p.m.) and aerated (0.1 l. of air per minute per 10 l. of beer). After 20 hours of incubation, when a good growth has been developed, 1 g. of 6α-fluoro-11β,21-dihydroxy-4,17 (20)-pregnadien-3-one 21-acetate puls 0.5 g. of 3-ketobisnor-4-cholen-22-al, dissolved in 16 ml. of dimethylformamide, is added and the incubation carried out at the same temperature (28° C.) and aeration for a period of 72 hours (final pH 8.3). The mycelium is filtered and extracted with three 200-ml. portions of acetone. The beer is extracted with three 1-liter portions of methylene chloride and the acetone extracts and the extracts of the beer are combined, dried over anhydrous sodium sulfate and evaporated. The resulting residue is purified by chromatography over a Florisil (synthetic magnesium silicate) chromatographic column using Skellysolve B hexanes containing increasing amounts of acetone to elute the column, followed by recrystallization from acetone-Skellysolve B hexane to give 6α-fluoro-11β,21-dihydroxy-1,4,17(20)-pregnatrien-3-one, a crystalline solid.

PREPARATION 2

*6α-Fluoro-11β,21-Dihydroxy-1,4,17(20)-Pregnatrien-3-One 21-Acetate*

A solution is prepared containing 50 mg. of 6α-fluoro-11β,21-dihydroxy-1,4,17(20)-pregnatrien-3-one in 1 ml. of pyridine and 1 ml. of acetic anhydride. The solution is allowed to stand at room temperature for a period of about 21 hours and is thereupon poured into ice water to give crystals of 6α-fluoro-11β,21-dihydroxy-1,4,17(20)-pregnatrien-3-one 21-acetate, which are purified by recrystallization from acetone-Skellysolve B hexanes.

Other 21-acylates are prepared by allowing 6α-fluoro-11β,21-dihydroxy-1,4,17(20)-pregnatrien-3-one to react with the selected organic carboxylic acid, preferably a hydrocarbon carboxylic acid containing from 1 to 12 carbon atoms, inclusive, or the anhydride or acyl halide of an organic carboxylic acid. Illustrative of the compounds thus produced are the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citroconate, and the like of 6α-fluoro-11β,21-dihydroxy-1,4,17(20)-pregnatrien-3-one.

If the selected acylating agent is solid, an inert solvent such as toluene, xylene, or dioxane can be added to effect dissolution and to provide a liquid esterification medium.

If the esterifying agent is the free acid, the reaction is carried out in the presence of an esterification catalyst. If the anhydride or acid chloride is used, an organic base such as pyridine is generally used.

PREPARATION 3

*11β,16α,21-Trihydroxy-1,4,17(20)-Pregnatrien-3-One 21-Acetate*

A mixture of 9.8 g. (0.0264 mol.) of 11β,21-dihydroxy-1,4,17(20)-pregnatrien-3-one 21-acetate, 2.76 g. (0.0248 mol.) of selenium dioxide, 33 ml. of water and 150 ml. of dioxane was heated at reflux for approximately 1 hour with stirring. The thus-obtained reaction mixture containing 11β,16α,21-trihydroxy-1,4,17(20)-pregnatrien-3-one 21-acetate was cooled in an ice bath to about 25° C. Five grams of a filter aid (synthetic magnesium silicate) was added to the cooled reaction mixture, stirred for about 15 minutes and filtered under vacuum through a synthetic magnesium silicate mat. The filtrate was added to 900 ml. of methylene chloride, followed by washing with four 200-ml. portions of water. The organic phase was filtered and evaporated to a volume of about 100 ml. and poured onto a chromatographic column packed with 800 g. Florisil (synthetic magnesium silicate). The chromatographic column was developed by eluting with Skellysolve B hexanes containing increasing amounts of acetone. The eluate fractions were freed of solvent and those fractions eluted with Skellysolve B hexanes containing 20 to 25% acetone were combined and recrystallized from acetone-Skellysolve B hexanes to give 6.74 g. of product melting at 178–181° C. Four additional recrystallizations from acetone-Skellysolve B hexanes gave 11β,16α,21-trihydroxy-1,4,17(20)-pregnatrien-3-one 21-acetate having a melting point of 179–181° C., [α]$_D$ +83 degrees (CHCl$_3$);

$\lambda_{max}^{EtOH}$ 243 m$\mu$, $a_M$ 15,600 and the following analysis:

*Analysis.*—Calcd. for $C_{23}H_{30}O_5$: C, 71.48; H, 7.82. Found: C, 71.68; H, 8.07.

In like manner, substituting a stoichiometric equivalent amount of 6α-fluoro-11β,21-dihydroxy-1,4,17(20)-pregnatrien-3-one 21-acetate (or other 21-acylates), results in the corresponding 21-acetate or 21-acylate of 6α-fluoro - 11β,16α,21-trihydroxy-1,4,17(20)-pregnatrien-3-one; and substituting 6α-methyl-11β,21-dihydroxy-1,4,17 (20)-pregnatrien-3-one 21-acetate (or other 21-acylates), prepared according to the procedure disclosed by Spero et al., JACS, 78, 6213 (1956), results in the corresponding 6α - methyl - 11β,16α,21-trihydroxy-1,4,17(20)-pregnatrien-3-one 21-acetate (or other 21-acylate).

PREPARATION 4

*20α-Chloro-11β,21-Dihydroxy-1,4,16-Pregnatrien-3-One 21-Acetate*

To a stirred solution of 965 mg. (0.0025 mol.) of 11β,16α,21 - trihydroxy-1,4,17(20)-pregnatrien-3-one 21-acetate, 100 ml. of methylene chloride and 556 mg. (0.003 mol.) of tri-n-butylamine at approximately 0° C. there was added dropwise over a 5-minute period, with continuous stirring, 393 mg. (0.24 mol.) of thionyl chloride, dissolved in 25 ml. of methylene chloride, while maintaining the temperature at 0° C. The thus-obtained reaction mixture comprising the 20α and 20β epimeric forms of 20 - chloro-11β,21-dihydroxy-1,4,16-pregnatrien-3-one 21-acetate was stirred for 1 hour at 0° C. followed by washing with three 20-ml. portions of dilute hydrochloric acid and four 50-ml. portions of water. The washed reaction mixture was filtered and the filtrate obtained was evaporated to a volume of about 25 ml. and poured onto a chromatographic column packed with 80 g. Florisil and then wetted with Skellysolve B hexanes. The chromatographic column was developed by eluting with Skellysolve B hexanes containing increasing amounts of acetone. The eluate fractions were freed of solvent and those fractions eluted with Skellysolve B hexanes containing 9 to 12% acetone were combined. Two recrystallizations from acetone-Skellysolve B hexanes gave 700 mg. of 20α-chloro-11β,21-dihydroxy-1,4,16-pregnatrien-3-one 21-acetate having a melting point of 160-161° C., $\lambda_{max}^{EtOH}$ 242 m$\mu$, $a_M$ 15,500 and the following analysis:

*Analysis.*—Calcd. for $C_{23}H_{29}ClO_4$: C, 68.22; H, 7.22; Cl, 8.76. Found: C, 68.17; H, 7.32; Cl, 8.88.

20β - chloro-11β,21-dihydroxy-1,4,16-pregnatrien-3-one 21-acetate is present in the mother liquors and can be recovered by further chromatography or countercurrent extraction, followed by crystallization.

In like manner, substituting a stoichiometric equivalent amount of the 21-acetate (or other 21-acylates) of 6α-fluoro - 11β,16α,21 - trihydroxy-1,4,17(20)-pregnatrien-3-one, 6α-methyl-11β,16α,21-trihydroxy-1,4,17(20)-pregnatrien-3-one, gives the corresponding 6α-fluoro- or 6α-methyl - 20α-chloro-11β,21-dihydroxy-1,4,16-pregnatrien-3-one 21-acetate (or other 21-acylate).

PREPARATION 5

*11β-Hydroxy-20β,21-Epoxy-1,4,16-Pregnatrien-3-One (II)*

To a solution of 2.03 g. (0.005 mol.) of 20α-chloro-11β,21-dihydroxy-1,4,16-pregnatrien-3-one 21-acetate and 100 ml. of methanol, cooled in an ice-bath, was added, with vigorous swirling over about a 2-minute period, 100 ml. of 0.1 N sodium hydroxide solution. After standing in the ice bath for an additional 5 minutes, the reaction mixture was filtered and the white crystalline precipitate, thus obtained, was collected and dried to yield 1.57 g. of a product comprising 11β-hydroxy-20β,21-epoxy-1,4,16-pregnatrien-3-one having a melting point of 193–203° C. The thus-obtained white crystalline product was then dissolved in about 25 ml. of ethylene dichloride and poured onto a chromatographic column packed with 120 g. Florisil and wetted with Skellysolve B hexanes. The chromatographic column was developed by eluting with Skellysolve B hexanes containing increasing amounts of acetone. The eluate fractions were freed of solvent and those fractions eluted with Skellysolve B hexanes-acetone (9:1) were recrystallized 3 times from acetone to give 11β-hydroxy-20β,21-epoxy-1,4,16-pregnatrien-3-one, melting at 205–215° C. Three additional recrystallizations from methanol did not raise the melting point of the 11β-hydroxy-20β,21-epoxy-1,4,16-pregnatrien-3-one which, following the methanol recrystallizations had a $$\lambda_{max.}^{EtOH} \; 242.5 \; m\mu, \; a_M \; 14,950$$

and the following analysis:

*Analysis.*—Calcd. for $C_{21}H_{26}O_3$: C, 77.27; H, 8.03. Found: C, 76.99; H, 8.05.

Substituting in preparation 5 as starting material: (a) 6α - fluoro - 20β-chloro-11β,21-dihydroxy-1,4,16-pregnatrien-3-one 21-acetate or other 21-acylates results in 6α-fluoro - 11β - hydroxy-20β,21-epoxy-1,4,16-pregnatrien-3-one. (b) 6α-methyl-20α-chloro-11β,21-dihydroxy-1,4,16-pregnatrien-3-one 21-acetate or other 21-acylates results in 6α - methyl-11β-hydroxy-20β,21-epoxy-1,4,16-pregnatrien-3-one.

The term "other 21-acylates" as used in the preceding paragraph is inclusive of 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate) the 21-undecolate, the 21-cinnamate, the 21-maleate, the 21-citraconate, and the like.

EXAMPLE 1

*11β,21-Dihydroxy-16α-Chloro-1,4,17(20)-Pregnatrien-3 One 21-Acetate*

In a dry 1 l., one-necked flask was placed 40 g. (0.555 mole) of tetrahydrofuran (freshly distilled from lithium aluminum hydride) and 500 ml. of dry methylene dichloride. This solution was cooled to about 5 to 15° C. and saturated with hydrogen chloride. A solution of 6.52 g. (0.02 mole) of 11β-hydroxy-20,21-oxido-1,4,16-pregnatrien-3-one in 100 ml. of dry methylene chloride was poured into the acidic solution and this reaction mixture stored at about +5° C. for a period of 18 hours. The solvents and excess hydrogen chloride were removed in vacuo and the residue dissolved in a mixture of 20 ml. of pyridine and 20 ml. of acetic anhydride. After standing at about 25° for 18 hours, the acetylation mixture was poured into 300 ml. of ice-water which was then extracted three times with 200-ml. portions of methylene chloride. The combined methylene chloride extracts were washed with two 100 ml. portions of dilute hydrochloric acid and a 100 ml. portion of water. The methylene chloride extracts were dried and evaporated in vacuo, giving 7.1 g. of a tan colored residue. This material was dissolved in 100 ml. of methylene chloride and chromatographed over a column of 700 g. of Florisil (anhydrous magnesium silicate) as follows: 22 fractions were taken, each fraction containing 500 ml. The eluting solvent consisted of 12% acetone and 88% Skellysolve B hexanes.

All fractions were papergrammed and it was determined that the slower moving major product, fractions 13 through 22, contained primarily the desired product. A highly purified sample of this material, recovered from the subsequent osmium tetroxide hydroxylation step melted at 187 to 189° C. and had an [α]$_D$ in chloroform —37 degrees $$\lambda_{max.}^{EtOH} \; 241.5 \; m\mu \; (a_M \; 16,550)$$

*Analysis.*—Calcd. for $C_{23}H_{29}ClO_4$: C, 68.22; H, 7.22; Cl, 8.76. Found: C, 67.81; H, 7.07; Cl, 8.75.

EXAMPLE 2

*6α-Fluoro-11β,21-Dihydroxy-16α-Chloro-1,4,17(20)-Pregnatrien-3-One 21-Acetate*

In substantially the same manner given in Example 1, subjecting 6α - fluoro - 11β-hydroxy-20β,21-oxido-1,4,16-pregnatrien-3-one to treatment with hydrogen chloride and subsequently acylation with acetic anhydride resulted in 6α - fluoro - 16α-chloro-11β,21-dihydroxy-1,4,17(20)-pregnatrien-3-one 21-acetate of melting point 180.5 to 182° C. and rotation [α]$_D$ in chloroform —37 degrees.

*Analysis.*—Calcd. for $C_{23}H_{28}ClFO_4$: C, 65.32; H, 6.67; Cl, 8.38; F, 4.49. Found: C, 65.36; H, 6.55; Cl, 8.43; F, 4.29.

EXAMPLE 3

*6α-Methyl-16α-Chloro-11β,21-Dihydroxy-1,4,17(20)-Pregnatrien-3-One 21-Acetate.*

In the same manner given in Example 1 submitting 6α-methyl-11β-hydroxy - 20,21 - oxido-1,4,16-pregnatrien-3-one to action by hydrogen chloride and subsequently to acetylation with acetic anhydride results in the corresponding compound, 6α-methyl-16α-chloro-11β,21-dihydroxy-1,4,17(20)-pregnatrien-3-one 21-acetate of melting point 191–192° C. and a rotation [α]$_D$ in chloroform of —45 degrees.

*Analysis.*—Calcd. for $C_{24}H_{31}ClO_4$: C, 68.80; H, 7.46; Cl, 8.46. Found: C, 68.57; H, 7.38; Cl, 8.58.

In the same manner shown in Example 1, 2, or 3, but using instead of acetic anhydride, anhydrides of other carboxylic acids, especially hydrocarbon carboxylic acids having from 1 to 12 carbon atoms such as propionic anhydride, butyric anhydride, valeric anhydride, hexanoic anhydride, benzoic anhydride, phenylacetic anhydride, lauric anhydride, and the like results in the production of the corresponding 21-ester of the selected 16α-chloro-11β,21-dihydroxy-1,4,17(20)-pregnatrien-3-one.

EXAMPLE 4

*16α-Chloro-11β,17α,21-Trihydroxy-1,4-Pregnadiene-3,20-Dione 21-Acetate (16α-Chloroprednisolone Acetate)*

In a 100 ml. one-necked flask containing a magnetic stirring bar were placed 445 mg. (0.0011 mole) of 16α-chloro - 11β,21 - dihydroxy-1,4,17(20)-pregnatrien-3-one 21-acetate, 10 mg. of osmium tetroxide, 30 ml. of tertiary butyl alcohol, 0.75 ml. of pyridine, 1.35 ml. of 2 N t-butanol solution of N-methylmorpholine oxide peroxide. This mixture was stirred at about 25° for a period of 5 hours. About 25 ml. of a freshly prepared solution of 1% sodium hydrosulfite was then added, stirred for 5 minutes and the reaction mixture filtered. The tertiary butyl alcohol was evaporated from the filtrate under vacuum at a temperature of about 35°. The residue was taken up in about 100 ml. of methylene chloride, the methylene chloride solution washed with two 50 ml. portions of water, filtered and evaporated under vacuum to give 400 mg. of crude product. This material was dissolved in 20 ml. of methylene chloride and chromatographed over a column of 50 g. of Florisil (anhydrous magnesium silicate) as follows: 18 fractions were taken, each fraction being 100 ml. The eluant used throughout consisted of 12% acetone and 88% Skellysolve B. It was determined by papergram analysis that fraction 7 through 13 contained the desired product with fractions 8, 9, and 10 being exceptionally pure. These three fractions were combined and recrystalized four times from ethyl acetate to give pure 16α-chloro - 11β,17α,21-trihydroxy-1,4-pregnadiene-3,20-dione 21-acetate of melting point 240 to 242° C. and rotation $[\alpha]_D$ of +61 degrees in chloroform.

Analysis.—Calcd. for $C_{23}H_{28}ClO_6$: C, 63.22; H, 6.69; Cl, 8.15. Found: C, 63.02; H, 6.56; Cl, 8.06.

EXAMPLE 5

16α-Chloro-6α-Fluoroprednisolone Acetate

In the same manner given in Example 4, 6α-fluoro-16α-chloro - 11β,21 - dihydroxy-1,4,17(20)-pregnatrien-3-one 21-acetate was treated with osmium tetroxide in the presence of N-methylmorpholine oxide peroxide at about 25° for 18 hours. At the termination of the reaction, the material was worked up as in Example 4 to give 16α-chloro-6α-fluoroprednisolone acetate of melting point 286° and a rotation $[\alpha]_D$ in acetone of +55 degrees.

Analysis.—Calcd. for $C_{23}H_{28}ClFO_6$: C, 60.72; H, 6.20; Cl, 7.79; F, 3.90. Found: C, 60.45; H, 6.04; Cl, 7.87; F, 3.90.

EXAMPLE 6

6α - Methyl-16α-Chloro-11β,17α,21-Trihydroxy-1,4-Pregnadiene-3,20-Dione 21-Acetate (6α-Methyl-16α-Chloroprednisolone Acetate)

In the same manner given in Example 4 treating 6α-methyl - 16α - chloro-11β,21-dihydroxy-1,4,17(20)-pregnatrien-3-one 21-acetate with osmium tetroxide and N-methylmorpholine oxide peroxide results in the corresponding 6α - methyl - 16α-chloro-11β,17α,21-trihydroxy-1,4-pregnadiene-3,20-dione, 21-acetate an amorphous solid of melting point 227–230°;

$\lambda_{max.}^{EtOH}$ 243 mμ($a_M$ 14,100).

In the same manner given in Example 4 other esters of 16α - chloroprednisolone, 6α-methyl-16α-chloroprednisolone, 6α-fluoro-16α-chloroprednisolone are obtained by starting with esters other than the 21-acetate, especially with esters having from 1 to 12 carbon atoms such as the 21-formate, -propionate, -butyrate, isobutyrate, tertiarylbutyl-acetate, hexanoate, octanoate, decanoate, laurate, benzoate, phenylacetate, phenylpropionate, cinnamate, crotonate, 2-butynoate, β-cyclopentylpropionate, and the like.

EXAMPLE 7

16α-Chloroprednisolone

Through a solution of 300 mg. sodium carbonate in 10 ml. of 95% ethanol was passed a stream of nitrogen for a period of 10 minutes. To this solution was added a solution of 300 mg. of 16a-fluoroprednisolone acetate in 5 ml. of ethanol similarly purged with a stream of nitrogen. The mixture was allowed to stand at room temperature under nitrogen for a period of 6 hours, then poured into 100 ml. of water and neutralized by the addition of 5% hydrochloric acid. The mixture was extracted with 3 portions of 25 ml. of methylene chloride, the methylene chloride extracts were combined, washed with water, dried and evaporated. The material thus obtained was recrystallized 3 times from methanol and Skellysolve B hexanes to give 16α-chloroprednisolone.

In the same manner described in Example 7, by subjecting to saponification in a nitrogen atmosphere, 6α-methyl-16α-chloroprednisolone acetate or 6α-fluoro-16α-chloroprednisolone acetate, the corresponding free alcohols, 6α-methyl-16α-chloroprednisolone and 6α-fluoro-16α-chloroprednisolone are obtained and can be isolated by extraction method in conventional known manner.

EXAMPLE 8

16α-Chloro-11β,17α,21-Trihydroxy-1,4-Pregnadiene-3,20-Dione 21 - (β - Cyclopentylpropionate) [16α-Chloroprednisolone 21-(β-Cyclopentylpropionate)]

A mixture was prepared containing 200 mg. of 16α-chloroprednisolone, 2 ml. of β-cyclopentylpropionyl chloride and 2 ml. of pyridine. After standing at room temperature for 4 hours, 50 ml. of water was added. The aqueous reaction mixture was allowed to stand overnight and was then extracted with three 10-ml. portions of methylene chloride. The methylene chloride extracts were evaporated and the residue recrystallized four times from methyl alcohol. In this manner 16α-chloroprednisolone 21-(β-cyclopentylpropionate) was obtained.

EXAMPLE 9

6α-Fluoro-16α-Chloroprednisolone 21-Phenylpropionate

A mixture containing 200 mg. of 6α-fluoro-16α-chloroprednisolone in 2 ml. of phenylpropionic anhydride and 1 ml. of pyridine was allowed to stand at room temperature for a period of 6 hours and was thereupon poured into 6 ml. of ice water. The aqueous solution was allowed to stand for 24 hours, whereupon it was extracted with three 15-ml. portions of methylene chloride. The methylene chloride extracts were combined, washed, dried over anhydrous sodium sulfate and evaporated. The thus obtained residue was recrystallized 4 times from methanol to give pure 6α-fluoro-16α-chloroprednisolone 21 - phenylpropionate [6α-fluoro-16α-chloro-11β,17α,21-trihydroxy - 1,4 - pregnadiene-3,20-dione 21-phenylpropionate].

In the same manner as shown in Examples 8 and 9, other esters of 16α-chloroprednisolene, 6α-fluoro-16α-chloroprednisolene, and 6α-methyl-16α-chloroprednisolene can be prepared by reacting the before-mentioned free alcohols with acid anhydrides or acid chlorides or organic carboxylic acids, preferably hydrocarbon carboxylic acids containing from 1 to 12 carbon atoms. Representative esters thus obtained include the formate, acetate, propionate, butyrate, valerate, hexanoate, heptanoate, octanoate, nonate, decanoate, undecanoate, laurate, benzoate, phenylacetate, phenylpropionate, cyclopentylpropionate, tertiary butylacetate, acrylate, crotonate, cinnamate, cyclohexylcarbonate, and the half esters of succinic, maleic, adipic or β,β-dimethylglutaric acid and the like of 16α-chloroprednisolene, 6α-methyl-16α-chloroprednisolone, 6α-fluoro-16αchloroprednisolone.

EXAMPLE 10

9α - Fluoro-16α-Chloro-11β,17α,21-Trihydroxy-1,4-Pregnadiene-3,20-Dione 21-Acetate (9α-Fluoro-16α-Chloroprednisolone 21-Acetate)

To a stirred solution of 590 mg. (0.00135 mole) of 16α-chloro - 11β,17α,21-trihydroxy-1,4-pregnadiene-3,20-dione 21-acetate in 8 ml. of pyridine was added 316 mg. of N-bromoacetamide. The solution was stirred at 25° for a period of 20 minutes and then cooled to 10° and maintained at this temperature while saturating with sulfur dioxide. The sulfur dioxide was passed as a stream of gas over the surface of the stirred reaction mixture. Thereupon 100 ml. of water was added and the solid precipitate collected on a filter. The precipitate was washed on the filter with water and then dried. The crude product, thus obtained, was purified by chromatography over 50 g. of Florisil (anhydrous magnesium silicate) by eluting with 12% acetone and 88% Skellysolve B hexanes. The thus-obtained purified material was 16α-chloro-17α, 21-dihydroxy-1,4,9(11)-pregnatrien-3,20-dione 21 - acetate which was used in the subsequent step without further purification.

To a stirred solution of 474 mg. (0.00113 mole) of crude 16α-chloro-17α,21-dihydroxy-1,4,9(11)-pregnatriene-3,20-dione 21-acetate in 32 ml. of tertiary butyl alcohol and 8 ml. of methylene chloride was added a mixture of 1.45 ml. of 70% perchloric acid in 10 ml. of water and a solution of 186 mg. of N-bromoacetamide in 6 ml. of tertiary butyl alcohol. After stirring the reaction mixture for 15 minutes at about 25° C. a solution of 266 mg. of sodium sulfite in 15 ml. of water was added. This mixture was then concentrated under reduced pressure to a volume of about 20 ml. and then diluted with 100 ml. of water and filtered. The dry, white precipitate, thus obtained, weighed 594 mg. This material, 16α-chloro-9α-bromo - 11β,17α,21 - trihydroxy-1,4-pregnadiene-3,20-dione 21-acetate, was used in the following step without further purification.

A mixture of 594 mg. (0.00113 mole) of 16α-chloro-9α-bromo - 11β,17α,21 - trihydroxy-1,4-pregnadiene-3,20-dione 21-acetate, 750 mg. of potassium acetate and 50 ml. of acetone was stirred and heated at reflux for 20 hours. The reaction mixture was then evaporated to dryness under reduced pressure and the residue extracted with methylene chloride. The extract was concentrated to a volume of about 20 ml. and poured onto a chromatographic column of 60 g. of Florisil (anhydrous magnesium silicate) and eluted with a mixture of 12% acetone and 88% Skellysolve B hexane. Evaporating the eluant yielded 368 mg. of 16α-chloro-9β,11β-epoxy-17α,21-dihydroxy-1,4-pregnadiene-3,20-dione 21-acetate which was used in the next step without further purification.

To 11.9 g. of hydrogen fluoride contained in a polyethylene bottle and cooled in a Dry-Ice alcohol bath, was added 21 ml. of cold tetrahydrofuran and then a cold solution of 368 mg. (0.000846 mole) of 16α-chloro-9β,11α-epoxy-17α,21-dihydroxy-1,4-pregnadiene-3,20 - dione 21-acetate, dissolved in 20 ml. of methylene chloride. The mixture was stirred at about 5° for 20 hours and then cautiously poured into an ice-cold solution of 57 g. of sodium carbonate in 1 l. of water. The aqueous solution was extracted with four 100-ml. portions of methylene chloride and these extracts combined, dried and evaporated to a volume of about 20 ml. This crude solution was poured onto a chromatographic column containing 50 g. of Florisil (anhydrous magnesium silicate) and the product eluted with a mixture of 15% acetone and 85% Skellysolve B hexanes. The fractions containing the product, as determined by paper chromatography, were combined and recrystallized from ethyl acetate to yield 201 mg. (32.8% yield) of 9α-fluoro-16α-chloro-11β,17α,21 trihydroxy-1,4-pregnadiene-3,20-dione 21-acetate of melting point 246 to 247° C. and rotation $[\alpha]_D$ in chloroform +61 degrees.

*Analysis.*—Calcd. for $C_{23}H_{28}ClFO_6$: C, 60.72; H, 6.20; Cl, 7.79; F, 4.18. Found: C, 60.46; H, 6.15; Cl, 7.75; F, 4.18.

EXAMPLE 11

*6α,9α-Difluoro-16α-Chloro-11β,17α,21-Trihydroxy-1,4-Pregnadiene-3,20-Dione 21-Acetate*

To a stirred solution of 520 mg. of 6α-fluoro-16α-chloroprednisolone 21-acetate in 5 ml. of pyridine was added 280 mg. of N-bromoacetamide. The solution was stirred at 25° C. for about 20 minutes and then cooled to 10° C. and maintained at this temperature, while a stream of sulfur dioxide is passed over the surface of the stirred reaction mixture. Water (100 ml.) was added and the solid precipitate collected on a filter, washed with water and dried. The crude product, 6α-fluoro-16α-chloro-11β,21-dihydroxy-1,4,9(11)-pregnatriene-3,20-dione 21-acetate, weighed 520 mg.—a 100% crude yield.

To a stirred solution of 520 mg. of crude 6α-fluoro-16α-chloro - 17α,21 - dihydroxy-1,4,9(11)-pregnatriene-3,20-dione, 21-acetate, dissolved in 34 ml. of tertiary butyl alcohol and 8 ml. of methylene chloride, was added a mixture of 1.53 ml. of 70% perchloric acid in 10.5 ml. of water and a solution of 195 mg. of N-bromoacetamide in 6.3 ml. of tertiary butyl alcohol. After stirring for 15 minutes at about 25°, a solution of 280 mg. of sodium sulfite in 15.8 ml. of water was added, the mixture concentrated under reduced pressure to a volume of about 20 ml., diluted with 100 ml. of water and filtered. The dried, white precipitate, 6α-fluoro-9α-bromo-16α-chloro-11β,17α,21-trihydroxy-1,4-pregnadiene-3,20-dione, 21-acetate, weighed 574 mg.—a 90% crude yield.

A mixture of 574 mg. of crude 6α-fluoro-9α-bromo-16α-chloro-11β,17α,21-trihydroxy-1,4-pregnadiene - 3,20-dione, 21-acetate, 713 mg. of potassium acetate and 50 ml. of acetone was stirred and heated at reflux for 20 hours. The mixture was then evaporated to dryness under vacuum and the residue extracted with methylene chloride. The extract was concentrated to a volume of about 20 ml. and poured onto a chromatographic column of 60 g. of Florisil (anhydrous magnesium silicate). The eluting solvent was 12% acetone—88% Skellysolve B and 100 ml. fractions were taken. Fractions 3 through 8 contained the desired product, 6α-fluoro-16α-chloro-9β,11β-epoxy-17α,21-dihydroxy-1,4-pregnadiene-3,20 - dione 21-acetate, and the combined weight of these evaporated fractions was 400 mg.—an 82% column yield.

To 11.9 g. of hydrogen fluoride contained in a polyethylene bottle and cooled in a Dry-Ice alcohol bath, was added 21 ml. of cold tetrahydrofuran and a cold solution of 400 mg. of 6α-fluoro-16α-chloro-9β,11β-epoxy-17α,21-dihydroxy-1,4-pregnadiene-3,20-dione 21-acetate in 20 ml. of methylene chloride. The mixture was stirred at about 5° for 20 hours and then cautiously poured into an ice-cold solution of 57 g. of sodium carbonate, dissolved in 1 l. of water. The aqueous solution was extracted with four 100-ml. portions of methylene chloride and these extracts combined, dried and evaporated. The residue was an amber mush, which upon the addition of 10 ml. of methylene chloride followed by stirring and filtration yielded 217 mg. of a white solid. This crude product was dissolved in 100 ml. of ethylene chloride and poured onto a chromatographic column containing 100 g. of Florisil (anhydrous magnesium silicate) and the product eluted with 100-ml. portions of 17% acetone—83% Skellysolve B (Fractions 1-18) and 20% acetone—80% Skellysolve B (Fractions 19-29). Fractions 10 through 29 contained the product and were combined to yield 174 mg. of material (41.6%). Recrystallization from ethyl acetate yielded 6α,9α-difluoro-16α-chloro-11β,17α,21-trihydroxy-1,4-pregnatriene-3,20-dione 21-acetate which decomposed at 291° and had the following analysis:

*Analysis.*—Calcd. for $C_{23}H_{27}ClF_2O_6$: C, 58.41; H, 5.76; F, 8.04; Cl, 7.50. Found: C, 58.49; H, 5.90; F, 7.73; Cl, 7.55.

EXAMPLE 12

*6α-Methyl-9α-Fluoro-16α-Chloro-11β,17α,21-Trihydroxy-1,4-Pregnadiene-3,20-Dione 21-Acetate*

In substantially the same manner shown in Example 10, 6α-methyl-16α-chloro - 11β,17α,21 - trihydroxy - 1,4-pregnadiene-3,20-dione 21-acetate, is dehydrated at the 9,11-positions with N-bromoacetamide followed by treatment with sulfur dioxide to give 6α-methyl-16α-chloro-17α,21-dihydroxy-1,4,9(11)-pregnatriene-3,20-dione 21-acetate.

This product was treated with N-bromoacetamide and perchloric acid in tertiary butyl alcohol to give 6α-methyl-9α-bromo-16α-chloro-11β,17α,21-trihydroxy-1,4 - pregnadiene-3,20-dione 21-acetate.

The thus-obtained product was treated with sodium acetate in acetone at reflux temperature to give 6α-methyl-16α-chloro-9β,11β-epoxy-17α,21-dihydroxy - 1,4 - pregnadiene-3,20-dione 21-acetate.

The thus-obtained epoxy compound was treated with hydrogen fluoride in methylene chloride containing tetrahydrofuran to give 6α-methyl-9α-fluoro-16α-chloro-11β,17α,21-trihydroxy-1,4-pregnatriene-3,20-dione 21-acetate.

EXAMPLE 13

9α-Fluoro-16α-Chloroprednisolone

Through a solution of 500 mg. sodium carbonate in 10 ml. of 95% ethanol was passed a stream of nitrogen for a period of 10 minutes. To this solution was added a solution of 300 mg. of 9α-fluoro-16α-chloroprednisolone acetate in 5 ml. of ethanol similarly purged with a stream of nitrogen. The mixture was allowed to stand at room temperature under nitrogen for a period of 6 hours, then poured into 100 ml. of water and neutralized by the addition of 5% hydrochloric acid. The mixture was extracted with three 25-ml. portions of methylene chloride, the methylene chloride extracts combined, washed with water, dried and evaporated. The material thus obtained was recrystallized 3 times from methanol and water to give 9α-fluoro-16α-chloroprednisolone.

In substantially the same manner described in Example 13, by subjecting to saponification in a nitrogen atmosphere 6α-methyl-9α-fluoro-16α-chloroprednisolone acetate or 6α,9α-difluoro-16α-chloroprednisolone acetate, the corresponding free alcohols, 6α-methyl-9α-fluoro-16α-chloroprednisolone and 6α,9α-difluoro-16α-chloroprednisolone, are obtained, and are isolated by methods known in the art.

EXAMPLE 14

9α-Fluoro-16α-Chloro-11β,17α,21-Trihydroxy-1,4 - Pregnadiene-3,20-Dione 21-(β-Cyclopentylpropionate) [9α-Fluoro-16α-Chloroprednisolone 21-(β-Cyclopentylpropionate)]

A mixture containing 200 mg. of 9α-fluoro-16α-chloroprednisolone, 2 ml. of β-cyclopentopropionyl chloride and 2 ml. of pyridine was allowed to stand at room temperature for 4 hours and then poured into 50 ml. of water. The aqueous reaction mixture was allowed to stand overnight and was thereupon extracted with three 10-ml. portions of methylene chloride. The methylene chloride extracts were combined, evaporated and the residue recrystallized 4 times from methyl alcohol to give 9α-fluoro-16α - chloroprednisolone 21-(β-cyclopentylpropionate). [9α-fluoro-16α-chloro-11β,17α,21-trihydroxy - 1,4 - pregnadiene-3,20-dione 21-(β-cyclopentylpropionate)].

EXAMPLE 15

6α,9α-Difluoro-16α-Chloroprednisolone 21-Phenylacetate

A mixture containing 200 mg. of 6α,9α-difluoro-16α-chloroprednisolone in 2 ml. of phenylacetic anhydride and 1 ml. of pyridine was allowed to stand at room temperature for a period of 24 hours and then poured into 50 ml. of ice water. The aqueous solution was allowed to stand for 24 hours and then extracted with three 15-ml. portions of methylene chloride. The methylene chloride extracts were combined, washed, dried over anhydrous sodium sulfate and evaporated to give a residue. The thus-obtained residue was recrystallized 4 times from methanol to give pure 6α,9α-difluoro-16α-chloroprednisolone 21-phenylacetate [6α,9α-difluoro-16α-chloro - 11β,17α,21-trihydroxy-1,4-pregnadiene-3,20-dione 21-phenylacetate].

EXAMPLE 16

In substantially the same manner given in Example 14, 9α-fluoro-16α-chloro-11β,17α,21-trihydroxy-1,4 - pregnadiene-3,20-dione in pyridine solution was reacted:

(a) with propionyl chloride to yield 9α-fluoro-16α-chloro-11β,17α,21 - trihydroxy - 1,4 - pregnadiene - 3,20-dione 21-propionate;

(b) with butyryl chloride to yield 9α-fluoro-16α-chloro-11β,17α,21-trihydroxy-1,4-pregnadiene-3,20-dione 21-butyrate;

(c) with benzoyl chloride to yield 9α-fluoro-16α-chloro-11β,17α,21-trihydroxy-1,4-pregnadiene - 3,20 - dione 21-benzoate;

(d) with lauryl chloride to yield 9α-fluoro-16α-chloro-11β,17α,21-trihydroxy-1,4-pregnadiene - 3,20 - dione 21-laurate;

(e) with crotonyl chloride to yield 9α-fluoro-16α-chloro-11β,17α,21 - trihydroxy - 1,4-pregnadiene - 3,20-dione 21-crotonate;

(f) with acrylyl chloride to yield 9α-fluoro-16α-chloro-11β,17α,21 - trihydroxy - 1,4 - pregnadiene - 3,20-dione 21-acrylate;

(g) with tertiary butylacetyl chloride to yield 9α-fluoro-16α - chloro - 11β,17α,21 - trihydroxy - 1,4 - pregnadiene-3,20-dione 21-tertiary butylacetate.

EXAMPLE 17

In substantially the same manner given in Example 15, 6α,9α-difluoro-16α - chloro - 11β,17α,21 - trihydroxy - 1,4-pregnadiene-3,20-dione in pyridine solution was reacted with (a) acetic anhydride to give 6α,9α-difluoro-16α-choro-11β,17α,21-trihydroxy-1,4-pregnadiene-3,20-dione 21-acetate;

(b) valeric anhydride to give 6α,9α-difluoro-16α-chloro-11β,17α,21-trihydroxy-1,4-pregnadiene-3,20 - dione 21-valerate;

(c) hexanoic anhydride to give 6α,9α-difluoro-16α-chloro-11β,17α,21-trihydroxy-1,4-pregnadiene-3,20 - dione 21-hexanoate;

(d) phenylpropionic anhydride to give 6α,9α-difluoro-16α-chloro-11β,17α,21-trihydroxy-1,4-pregnadiene - 3,20-dione 21-phenylpropionate;

(e) decanoic anhydride to give 6α,9α-difluoro-16α-chloro-11β,17α,21-trihydroxy-1,4-pregnadiene-3,20 - dione 21-decanoate;

(f) succinic anhydride to give 6α,9α-difluoro-16α-chloro-11β,17α,21-trihydroxy-1,4 - pregnadiene - 3,20 - dione 21-hemisuccinate;

(g) maleic anhydride to give 6α,9α-difluoro-16α-chloro-11β,17α,21-trihydroxy-1,4-pregnadiene - 3,20 - dione 21-hemimaleate;

(h) β,β-dimethylglutaric anhydride to give 6α,9α-difluoro-16α-chloro-11β,17α,21-trihydroxy - 1,4 - pregnadiene-3,20-dione 21-β,β-dimethylglutarate.

EXAMPLE 18

In substantially the same manner given in Example 15, 6α-methyl-9α-fluoro-16α-chloro - 11β,17α,21 - trihydroxy-1,4-pregnadiene-3,20-dione in pyridine solution was reacted with:

(a) butyric anhydride to give 6α-methyl-9α-fluoro-16α-chloro-11β,17α,21-trihydroxy-1,4-pregnadiene-3,20 - dione 21-butyrate;

(b) propionic anhydride to give 6α-methyl-9α-fluoro-16α-chloro-11β,17α,21-trihydroxy-1,4 - pregnadiene - 3,20-dione 21-propionate;

(c) valeric anhydride to give 6α-methyl-9α-fluoro-16α-chloro-11β,17α,21-trihydroxy-1,4-pregnadiene-3,20 - dione 21-valerate;

(d) hexanoic anhydride to give 6α-methyl-9α-fluoro-16α-chloro-11β,17α,21-trihydroxy-1,4 - pregnadiene - 3,20-dione 21-hexanoate;

(e) octanoic anhydride to give 6α-methyl-9α-fluoro-16α-chloro-11β,17α,21-trihydroxy-1,4 - pregnadiene - 3,20-dione 21-octanoate;

(f) lauric anhydride to give 6α-methyl-9α-fluoro-16α-chloro-11β,17α,21-trihydroxy 1,4-pregnadiene - 3,20 - dione 21-laurate;

(g) benzoic anhydride to give 6α-methyl-9α-fluoro-16α-chloro-11β,17α,21-trihydroxy-1,4-pregnadiene-3,20 - dione 21-benzoate;

(h) phenylpropionic anhydride to give 6α-methyl-9α-fluoro-16α-chloro-11β,17α,21 - trihydroxy - 1,4 - pregnadiene-3,20-dione 2-phenylpropionate;

(i) cinnamic anhydride to give 6α-methyl-9α-fluoro-16α-chloro-11β,17α,21-trihydroxy-1,4 - pregnadiene - 3,20-dione 21-cinnamate;

(j) butynoic anhydride to give 6α-methyl-9α-fluoro-16α-chloro-11β,17α,21-trihydroxy-1,4-pregnadiene - 3,20-dione 21-butynoate;

(k) succinic anhydride to give 6α-methyl-9α-fluoro-16α-chloro-11β,17α,21-trihydroxy-1,4-pregnadiene - 3,20-dione 21-hemisuccinate;

(l) maleic anhydride to give 6α-methyl-9α-fluoro-16α-chloro-11β,17α,21-trihydroxy-1,4-pregnadiene-3,20 - dione 21-hemimaleate.

In substantially the same manner as shown in Examples 14 and 15, other esters of 9α-fluoro-16α-chloroprednisolone, 6α,9α-difluoro-16α-chloroprednisolone, and 6α-methyl-9α-fluoro-16α-chloroprednisolone can be prepared by reacting the before-mentioned free alcohols with acid anhydrides or acid chlorides of organic carboxylic acid, preferably hydrocarbon carboxylic acids containing from 1 to 12 carbon atoms. Representative esters thus obtained include the isobutyrate, tertiarybutylacetate, valerate, hexanoate, heptanoate, cyclohexylcarboxylate, octanoate, nonate, decanoate, undecanoate, laurate, benzoate, phenylacetate, phenylpropionate, cyclopentylpropionate, crotonate, acrylate, butynoate, cinnamate, undecylate, and the half esters of succinic, maleic, β,β-dimethyl-glutaric acid, and the like.

Alternatively, the synthesis of 6α-fluoro-16α-chloroprednisolone, and 6α-methyl-16α-chloroprednisolone can be carried out in a reversed order of steps as shown in the example below.

EXAMPLE 20

6α - Fluoro - 16α - Chloro - 11β,17α,21 - Trihydroxy - 1,4-Pregnadiene-3,20-Dione 21 - Acetate (6α - Fluoro - 16α-Chloroprednisolone 21-Acetate).

In a 5-l. three-neck flask fitted with a stirrer, gas inlet tube and a drying tube were placed 3 l. of methylene chloride and 225 ml. of freshly distilled tetrahydrofuran. This solution was cooled to about 10° and saturated with gaseous hydrogen chloride. 6α-fluoro-11β-hydroxy-20β,21-oxido-4,16-pregnadien-3-one (36 g.-0.104 mole) was dissolved in 500 ml. of methylene chloride and poured into the acidic solution. The reaction mixture was stirred at a pot temperature of about 10° for 18 hours. The solvent, tetrahydrofuran and excess acid were then evaporated under vacuum at a pot temperature of less than 40°. The crude residue was dissolved in a solution made up of 110 ml. of pyridine and 110 ml. of acetic anhydride. After standing overnight at about 25°, the solution was poured into 3 l. of ice water, extracted with methylene chloride and the combined extracts washed with dilute hydrochloric acid and then water. Evaporation of the methylene chloride left a residue of 30 g. of crude product. This material was purified by chromatographing over 800 g. of Florisil. The eluting solvent was 10% acetone—90% Skellysolve B and 535-ml. fractions were collected. Two products were obtained as determined by papergram analysis. The least polar of these two materials (fractions 10 through 22) was 20-chloro-6α-fluoro-21-acetoxy-11β-hydroxy-4,17(20)-pregnadien-3-one. The more polar material (fractions 26 through 31) was 16-chloro-6α-fluoro-21-acetoxy-11β-hydroxy - 4,17(20) - pregnadien - 3 - one. During a subsequent preparation of the desired compound, a portion of the column fractions containing the more polar material was recrystallized four times from acetone and gave the following physical constants: M.P. 164–166°; and rotation [α]$_D$ CHCl$_3$ —5 degrees.

Analysis.—Calcd. for C$_{23}$H$_{30}$ClFO$_4$: C, 65.01; H, 7.12; Cl, 8.34; F, 4.47. Found: C, 65.37; H, 7.17; Cl, 8.88; F, 4.51.

6α-fluoro-11β-hydroxy-20,21-oxido-4,16 - pregnadien-3-one was prepared from 6α-fluoro-11β,21-dihydroxy-4,17(20)-pregnadien-3-one 21-acetate in the following manner:

A mixture of 0.5 g. of 6α-fluoro-11β,21-dihydroxy-4,17(20)-pregnadien-3-one 21-acetate, 0.2 g. of selenium dioxide, 10 ml. of dioxane and 2 ml. of water was heated under reflux for approximately one hour with stirring. The solvent was then distilled in vacuo to give a residue. The thus-obtained residue was dissolved in methylene chloride, washed with water and dried over anhydrous sodium sulfate. The dried methylene chloride solution was then poured onto a 40 g. Florisil (synthetic magnesium silicate) chromatographic column. The chromatographic column was developed by eluting with commercial hexanes containing increasing amounts of acetone. The eluate fractions were freed of solvent and the fractions eluted with commercial hexanes containing 30% acetone gave 220 mg. of product which was recrystallized twice from ethyl acetate to yield 6α-fluoro-11β,16α,21 - trihydroxy - 4,17(20) - pregnadien - 3 - one 21-acetate having a melting point of 185–187° C., [α]$_D$+105 degrees (CHCl$_3$) and the following analysis:

Analysis.—Calcd. for C$_{23}$H$_{31}$FO$_5$: C, 67.95; H, 7.69; F, 4.67. Found: C, 68.04; H, 8.04; F, 4.70.

To a solution of 32 g. of 6α-fluoro-11β,16α,21-trihydroxy-4,17(20)-pregnadien-3-one 21-acetate in 915 ml. of methylene chloride containing 19.4 ml. of tri-n-butylamine cooled to 0° C. there was added 5.4 ml. of thionyl chloride over a period of 5 minutes. The reaction mixture was stirred at 0–5° C. for 30 minutes and then washed twice with dilute hydrochloric acid and once with water. The washed solution was then dried over sodium sulfate and poured onto a 2 kg. Florisil chromatographic column. The chromatographic column was developed by eluting with commercial hexanes containing increasing amounts of acetone. The eluate fractions were freed of solvent and those fractions eluted with commercial hexanes containing 15% acetone were combined to yield 15.1 g. of a product comprising 20α-chloro - 6α - fluoro - 11β,21 - dihydroxy - 4,16 - pregnadien-3-one 21-acetate, which was used without further purification.

A portion of the thus-obtained product was recrystallized from ethyl acetate-commercial hexanes to yield 20α-chloro - 6α - fluoro - 11β,21 - dihydroxy - 4,16 - pregnadien-3-one 21-acetate having a melting point of 158–160° C. and the following analysis:

Analysis.—Calcd. for C$_{23}$H$_{30}$ClFO$_4$: C, 65.07; H, 7.12; Cl, 8.35; F, 4.48. Found: C, 65.08; H, 7.09; Cl, 8.55; F, 4.71.

20β - chloro - 6α - fluoro - 11β,21 - dihydroxy - 4,16-pregnadien-3-one 21-acetate is present in the mother liquor and can be recovered by further chromatography or countercurrent extraction followed by recrystallization.

767 mg. of the product comprising 20α-chloro-6α-fluoro - 11β,21 - dihydroxy - 4,16 - pregnadien - 3 - one 21-acetate, was dissolved in 60 ml. of methanol containing 20 ml. of N/10 sodium hydroxide. The reaction mixture was maintained at about 26° C. for approximately 10 minutes after which time the excess alkali was neutralized by the addition of 1.7 ml. of N/10 hydrochloric acid. A residue crystallized following distillation in vacuo of most of the solvent from the neutralized solution. The thus-obtained residue was recrystallized from ethyl acetate-commercial hexanes to give 300 mg. of a product having a melting point of 140–146° C. Two further recrystallizations from ethyl acetate-commercial hexanes yielded 6α-fluoro-11β-hydroxy-20β, 21-epoxy-4,16-pregnadien-3-one having a melting point of 152–154° C., [α]$_D$+189 degrees (CHCl$_3$) and the following analysis:

Analysis.—Calcd. for C$_{21}$H$_{27}$FO$_3$: C, 72.80; H, 7.86; F, 5.48. Found: C, 72.88; H, 7.78; F, 5.34.

6α - fluoro - 11β - hydroxy - 20α,21 - epoxy - 4,16-pregnadien-3-one is present in the mother liquors and can be recovered by further chromatography or countercurrent extraction followed by recrystallization.

A mixture of 3.4 g. (0.00795 mole) of 16α-chloro-6α - fluoro - 11β,21 - dihydroxy - 4,17(20) - pregnadien-3-one 21-acetate, 1.66 g. of selenium dioxide, 5.1 ml. of pyridine and 100 ml. of tertiary butanol was stirred and heated at reflux for about 18 hours. After filtering and evaporating the solvent under vacuum the residue was dissolved in about 100 ml. of methylene chloride and washed with dilute hydrochloric acid and water. The organic phase was evaporated to dryness under vacuum, leaving a residue weighing 1.84 g. This crude product was chromatographed over 200 g. of Florisil. The eluting solvent was 12% acetone—88% Skellysolve B; 200-ml. fractions were collected. Fractions 13 through 19 contained the desired product, 565 mg.—a 17% yield of 16α - chloro - 6α - fluoro - 11β,21 - dihydroxy - 1,4, 17(20)-pregnatrien-3-one of melting point 180.5–182°; rotation $[\alpha]_D$ CHCl$_3$ —37 degrees.

A solution of 565 mg. (0.00133 mole) of 16α-chloro-6α - fluoro - 11β,21 - dihydroxy - 1,4,17(20) - pregnatrien-3-one 21-acetate, osmium tetroxide (12 mg.), pyridine (1 ml.), tertiary butanol (50 ml.) and 1.63 ml. of a 2.0 N tert. butanol solution of N-methylmorpholine oxide peroxide was stirred at about 25° for about 18 hours. Ten milliliters of a 1% sodium hydrosulfite solution was added, stirred 10 minutes and the mixture filtered through a mat of Magnesol. Evaporation of the filtrate under vacuum yielded 409 mg. of crude product which was chromatographed over 50 g. of Florisil. The eluting solvent was 12% acetone-88% Skellysolve B hexanes; 100-ml. fractions were collected.

Fractions 11 through 17 contained the desired material, Tollen's positive, 16α-chloro-6α-fluoroprednisolone acetate. Since these fractions were small and still contained starting material, the process was repeated on a larger scale using 5.04 g. of starting material. The product was worked up as described before and recrystallized from ethyl acetate to give about 17% of the desired product 16α-chloro-6α-fluoroprednisolone acetate of melting point 286° C. and rotation $[\alpha]_D$ in acetone of +55 degrees.

EXAMPLE 21

*16α-Chloro-21-Iodo-11β17α-Dihydroxy-1,4-Pregnadiene-3,20-Dione*

A solution of one gram of 16α-chloroprednisolone, dissolved in seven milliliters of pyridine, was cooled to zero degrees and 0.4 milliliter of methanesulfonyl chloride was added with stirring. After stirring for a period of two hours at 0° C., 40 ml. of water was added. The precipitate was collected on a filter paper, washed with water and air dried to give a white powder, 16α-chloroprednisolone 21-methanesulfonate.

A solution of 1 g. of crude 21-methanesulfonate of 16α-chloroprednisolone, dissolved in 20 ml. of boiling acetone, was treated with one gram of sodium iodide in 50 ml. of acetone. The mixture was stirred at the boiling point for a period of 15 minutes and then concentrated to approximately one half volume. After cooling to room temperature, a cold solution of 0.2 gram of sodium thiosulfate in 40 ml. of water was added. The mixture was further chilled to a temperature of about 5° and then filtered. The ivory-colored, crystalline product, 16α-chloro - 21 - iodo-11β,17α-dihydroxy-1,4-pregnadiene-3, 20-dione was washed with water, dried and used without further purification for the preparation of the 21-desoxy steroid and the preparation of the phosphate of 16α-chloroprednisone.

In the same manner given in Example 21, 6α-fluoro-16α - chloroprednisolone, 6α-methyl-16α-chloroprednisolone, 9α-fluoro-16α-chloroprednisolone, 6α,9α-difluoro-16α-chloroprednisolone and 6α-methyl-9α-fluoro-16α-chloroprednisolone can be converted with methanesulfonyl chloride, ethanesulfonyl chloride, propanesulfonyl chloride, toluenesulfonyl chloride or benzensulfonyl chloride to their respective 21-esters, namely the 21-methanesulfonate, 21-ethanesulfonate, 21-propanesulfonate, 21-toluene sulfonate or 21-benzenesulfonate of 6α-fluoro-16α-chloroprednisolone, 6α - methyl-16α-chloroprednisolone, 9α - fluoro - 16α-chloroprednisolone, 16α-chloroprednisolone, 6α,9α-difluoro-16α-chloroprednisolone and 6α-methyl-9α-fluoro-16α-chloroprednisolone which are isolated by precipitation as in Example 21 or by extraction in known manner.

These organic sulfonic esters can be then converted to their 21-iodides with sodium or potassium iodide in acetone as shown in Example 21. In this manner the following compounds are obtained:

6α-fluoro-16α-chloro-21-iodo-11β,17α-dihydroxy-1,4-pregnadiene-3,20-dione,
6α-methyl-16α-chloro-21-iodo-11β,17α-dihydroxy-1,4-pregnadiene-3,20-dione,
6α,9α-difluoro-16α-chloro-21-iodo-11β,17α-dihydroxy-1,4-pregnadiene-3,20-dione,
6α-methyl-9α-fluoro-16α-chloro-21-iodo-11β,17α-dihydroxy-1,4-pregnadiene-3,20-dione,
9α-fluoro-16α-chloro-21-iodo-11β,17α-dihydroxy-1,4-pregnadiene-3,20-dione.

EXAMPLE 22

*16α-Chloro-11β,17α-Dihydroxy-1,4-Pregnadiene-3,20-Dione*

Two hundred milligrams of crude 6α-chloro-11β,17α-dihydroxy-21-iodo-1,4-pregnadiene-3,20-dione was slurried with 5 ml. of acetic acid and stirred for a period of 45 minutes. An aqueous solution of 250 mg. of sodium thiosulfate pentahydrate was added until the iodine color disappeared. Additional water was added (50 ml.) and the mixture extracted with three 25-ml. portions of methylene chloride. The methylene chloride extracts were combined, washed with water and cold sodium bicarbonate solution until all acetic acid was neutralized. After drying over anhydrous sodium sulfate, the solution was concentrated to approximately 15 ml. and chromatographed by eluting with increasing proportions of acetone in Skellysolve B hexanes over 10 g. of Florisil (synthetic magnesium silicate). Fractions of 50 ml. were taken. The fractions containing the 16α-chloro-11β,17α-dihydroxy-1,4-pregnadiene-3,20-dione, as determined by papergram analyses, were combined and evaporated to give a residue which was recrystallized 3 times from methanol. The thus-obtained product was 16α-chloro-11β,17α-dihydroxy-1,4-pregnadiene-3,20-dione.

In the same manner, dehalogenating with sodium or potassium thiosulfate or other reducing agents such as zinc and acetic acid, sodium or potassium sulfites or bisulfites, other 21-iodo compounds such as:

9α - fluoro - 16α - chloro-11β,17α-dihydroxy-21-iodo-1,4-pregnadiene-3,20-dione;
6α - fluoro - 16α-chloro-11β,17α-dihydroxy-21-iodo-1,4-pregnadiene-3,20-dione;
6α,9α - difluoro - 16α-chloro-11β,17α-dihydroxy-21-iodo-1,4-pregnadiene-3,20-dione;
6α-methyl-16α-chloro-11β,17α-dihydroxy-21-iodo-1,4-pregnadiene-3,20-dione;
6α-methyl-9α-fluoro-16α-chloro-11β,17α-dihydroxy-21-iodo-1,4-pregnadiene-3,20-dione are converted into the corresponding 21-methyl steroids,
9α-fluoro-16α-chloro-11β,17α-dihydro-1,4-pregnadiene-3,20-dione;
6α-fluoro-16α-chloro-11β,17α-dihydro-1,4-pregnadiene-3,20-dione;
6α,9α-difluoro-16α-chloro-11β,17α-dihydro-1,4-pregnadiene-3,20-dione;
6α-methyl-16α-chloro-11β,17α-dihydro-1,4-pregnadiene-3,20-dione;
6α-methyl-9α-fluoro-16α-chloro-11β,17α-dihydro-1,4-pregnadiene-3,20-dione.

EXAMPLE 23

*16α-Chloro-11β,17α,21-Trihydroxy-1,4-Pregnadiene-3,20-Dione 21-Dihydrogen Phosphate (16α-Chloro-Prednisolone 21-Dihydrogenphosphate)*

Silver dihydrogen phosphate was prepared by the reaction of trisilver phosphate with phosphoric acid in stoichiometric quantities. A mixture was prepared containing 20 ml. of acetonitrile, 2 g. of silver dihydrogen phosphate, and 1 g. of 16α-chloro-21-iodo-11β,17α-dihydroxy-1,4-pregnadiene-3,20-dione. This mixture was refluxed in a nitrogen atmosphere with stirring for a period of 75 minutes.

The reaction mixture was cooled for a period of about 1 hour to room temperature. To this mixture was added 20 g. of ice water and the acetonitrile was removed in vacuo at a temperature below 25° C. The pH of the aqueous suspension was adjusted to 6.2 to 6.5 by the addition of a saturated aqueous solution of sodium carbonate. The solid precipitate which formed was recovered by filtration. The precipitate was washed with water and the filtrate and washwaters combined and freeze-dried to separate a solid material from the water. The solid material was triturated with methanol and the methanol-insoluble material was separated by filtration. The filtrate was concentrated until crystallization began. It was then allowed to stand in the refrigerator overnight and the crystals collected on filter. After several washings with absolute ether and recrystallization from methanol, 16α-chloroprednisolone-21-dihydrogenphosphate was obtained.

Treating a solution of 16α-chloroprednisolone-21-dihydrogen-phosphate in methanol with sodium hydroxide (2.5 N) and adjusting the mixture to a pH of 9 to 10 by the addition of sufficient sodium methoxide then adding ether to cause precipitation, results in the production of 16α-chloroprednisolone-21-phosphate disodium salts.

In the same manner as given in Example 23 treating 6α-fluoro-21-iodo-11β,17α-dihydroxy-1,4-pregnadiene-3,20-dione with silver dihydrogenphosphate results in the corresponding 21-dihdyrogenphosphate of 6α-fluoro-16α-chloro-11β,17α,21-trihydroxy-1,4-pregnadiene-3,20-dione.

In the same manner given in Example 23,

6α-methyl-16α-chloro-11β,17α,21-trihydroxy-1,4-pregnadiene-3,20-dione 21-dihydrogenphosphate,
6α,9α-difluoro-16α-chloro-11β,17α,21-trihydroxy-1,4-pregnadiene-3,20-dione 21-dihydrogen phosphate,
6α-methyl-9α-fluoro-16α-chloro-11β,17α-dihydroxy-1,4-pregnadiene-3,20-dione 21-dihydrogen phosphate,
9α-fluoro-16α-chloro-11β,17α,21-trihydroxy-1,4-pregnadiene-3,20-dione 21-dihydrogen phosphate and the respective disodium salts thereof can be produced.

EXAMPLE 24

*16α-Chloro-21-Fluoro-11β,17α-Dihydroxy-1,4-Pregnadiene-3,20-Dione*

A solution of 1 g. of 16α-chloro-11β,17α-dihydroxy-21-iodo-1,4-pregnadiene-3,20-dione in 200 ml. of acetonitrile at 45° C. was protected from light and 0.8 ml. of 50% aqueous solution of silver fluoride was added with stirring. The cloudy, brown-colored solution was stirred continuously at a temperature between 45 and 50° and 1.5 ml. of silver fluoride solution added. One hour later, another 1.5 ml. of silver fluoride solution was added. After the last addition, stirring was continued for a period of two hours. The brown suspension was filtered through a bed of diatomaceous earth (Celite) and the filtrate evaporated at reduced pressure at a temperature of about 50° C. The brownish residue was extracted with four 30-ml. portions of methylene chloride. The methylene chloride extracts were combined, concentrated to dryness and the residue recrystallized four times from methanol and Skellysolve B hexanes to give pure 16α-chloro-21-fluoro-11β,17α-dihydroxy-1,4-pregnadiene-3,20-dione.

In the same manner given in Example 24 other 21-fluorides can be synthesized from the corresponding 16α-chloro-21-iodo-11β,17α-dihydroxy-1,4-pregnadiene-3,20-dione and can be recovered by extraction, filtration, recrystallization or chromatography in conventional manners. By using the starting materials given in Example 21 the following representative 21-fluoro-compounds are obtained:

6α-methyl-16α-chloro-21-fluoro-11β,17α-dihydroxy-1,4-pregnadiene-3,20-dione;
6α-methyl-9α,21-difluoro-16α-chloro-11β,17α-dihydroxy-3,20-dione,
6α,9α,21-trifluoro-16α-chloro-11β,21-dihydroxy-1,4-pregnadiene-3,20-dione,
6α,21-difluoro-16α-chloro-11β,21-dihydroxy-1,4-pregnadiene-3,20-dione and
9α,21-difluoro-16α-chloro-11β,17α-dihydroxy-1,4-pregnadiene-3,20-dione.

EXAMPLE 25

*16α-Chloro-11β,17α-Dihydroxy-1,4-Pregnadiene-3,20-Dione-17-Acetate*

A solution of 2.0 g. of 16α-chloro-11β,17α-dihydroxy-1,4-pregnadiene-3,20-dione, 5 ml. of distilled acetic anhydride, 500 mg. of p-toluenesulfonic acid and 50 ml. of acetic acid was stirred at room temperature (about 25° C.) under a stream of nitrogen for 6 hours. The mixture was then poured with vigorous stirring into 500 ml. of water. The aqueous reaction mixture was extracted with two 250-ml. portions of chloroform, the extracts were combined, washed twice with water, then 200 ml. of 5% sodium hydroxide solution, again twice with water, dried over anhydrous sodium sulfate and evaporated to dryness. The dry residue was redissolved in acetone, poured onto a column of 75 g. alumina and chromatographed with 75 ml. of Skellysolve B hexanes containing increasing amounts of acetone. The fractions containing 16α-chloro-11β,17α-dihydroxy-1,4-pregnadiene-3,20-dione 17-acetate as determined by papergram were combined, evaporated, and three times recrystallized from ethyl acetate to give crystalline 16α-chloro-11β,17α-dihydroxy-1,4-pregnadiene-3,20-dione 17-acetate.

Substituting other lower-hydrocarbon carboxylic acid anhydrides for the acetic anhydride is productive of other 16α-chloro-11β,17α-dihydroxy-1,4-pregnadiene-3,20-dione 17-acylates wherein the acyl radical of the acylate group is the acyl radical of, for example, a lower-aliphatic acid, e.g., formic (formic acid plus acetic anhydride), propionic, butyric, isobutyric, valeric, isovaleric, trimethylacetic, 2-methylbutyric, 3-ethylbutyric, hexanoic, diethylacetic, heptanoic, octanoic, α-ethyl-isovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, 3-methyl-α-naphthoic, an aralkyl acid, e.g., phenylacetic, phenylpropionic, diphenylacetic, triphenylacetic, and the like.

In the same manner given in Example 25, other esters of substituted 16α-chloro-11β,17α-dihydroxy-1,4-pregnadiene-3,20-diones can be made such as the acetate, propionate, hexanoate, benzoate, phenylacetate, laurate, and the like of 6α-fluoro-16α-chloro-11β,17α-dihydroxy-1,4-pregnadiene-3,20-dione,
6α,9α-difluoro-16α-chloro-11β,17α-dihydroxy-1,4-pregnadiene-3,20-dione,
6α-methyl-16α-fluoro-11β,17α-dihydroxy-1,4-pregnadiene-3,20-dione,
6α-methyl-9α-fluoro-16α-chloro-11β,17α-dihydroxy-1,4-pregnadiene-3,20-dione and
9α-fluoro-16α-chloro-11β,17α-dihydroxy-1,4-pregnadiene-3,20-dione.

EXAMPLE 26

*16α-Chloro-11β,17α,21-Trihydroxy-1,4-Pregnadiene-3,20-Dione 21-Hemisuccinate Sodium Salt [16α-Chloroprednisolone 21-Hemisuccinate Sodium Salt]*

Sodium hydroxide solution (0.1 normal) was slowly added to a stirred solution of 2 g. of 16α-chloro-11β,17α,21-trihydroxy-1,4-pregnadiene-3,20-dione 21-hemisuccinate in 50 ml. of acetone until the pH rose to 7.4. During the addition of NaOH solution, 100 ml. of water was also added.

The solution was concentrated at 25° C. under vacuum to remove the acetone. The resulting aqueous solution of 16α - chloro - 11β,17α,21-trihydroxy-1,4-pregnadiene-3,20-dione 21-hemisuccinate sodium salt was filtered, freeze-dried and recrystallized to give pure 16α-chloro-11β,17α,21-trihydroxy-1,4 - pregnadiene-3,20-dione 21-hemisuccinate sodium salt.

In the same manner given in Example 26 other sodium salts of substituted 16α-chloroprednisolone 21-hemisuccinates can be prepared such as:

9α-fluoro-16α-chloro-11β,17α,21-trihydroxy-1,4-pregnadiene-3,20-dione 21-hemisuccinate sodium salt,
6α-methyl-16α-chloro-11β,17α,21-trihydroxy-1,4-pregnadiene-3,20-dione 21-hemisuccinate sodium salt,
6α-methyl-9α-fluoro-16α-chloro-11β,17α,21-trihydroxy-1,4-pregnadiene-3,20-dione 21-hemisuccinate sodium salt,
6α-fluoro-16α-chloro-11β,17α,21-trihydroxy-1,4-pregnadiene-3,20-dione 21-hemisuccinate sodium salt,
6α,9α-difluoro-16α-chloro-11β,17α,21-trihydroxy-1,4-pregnadiene-3,20-dione 21-hemisuccinate sodium salt
and the like.

We claim:
1. 9α - fluoro - 16α-chloro-11β,17α,21-trihydroxy-1,4-pregnadiene-3,20-dione.
2. 9α - fluoro - 16α-chloro-11β,17α,21-trihydroxy-1,4-pregnadiene-3,20-dione 21-acylates in which the acyl radical is that of a hydrocarbon carboxylic acid containing from 1 to 12 carbon atoms, inclusive.
3. 9α - fluoro - 16α-chloro-11β,17α,21-trihydroxy-1,4-pregnadiene-3,20-dione 21-acetate.
4. 6α,9α - difluoro - 16α-chloro-11β,17α,21-trihydroxy-1,4-pregnadiene-3,20-dione.
5. 6α,9α - difluoro-16α - chloro-11β,17α,21-trihydroxy-1,4-pregnadiene-3,20-dione 21-acylates in which the acyl radical is that of a hydrocarbon carboxylic acid containing from 1 to 12 carbon atoms, inclusive.
6. 6α,9α - difluoro - 16α-chloro-11β,17α,21-trihydroxy-1,4-pregnadiene-3,20-dione 21-acetate.
7. 6α - methyl - 9α - fluoro-16α-chloro-11β,17α,21-trihydroxy-1,4-pregnadiene-3,20-dione.
8. 6α - methyl - 9α - fluoro-16α-chloro-11β,17α,21-trihydroxy-1,4-pregnadiene-3,20-dione 21-acylates in which the acyl radical is that of a hydrocarbon carboxylic acid containing from 1 to 12 carbon atoms, inclusive.
9. 6α - methyl - 9α - fluoro-16α-chloro-11β,17α,21-trihydroxy-1,4-pregnadiene-3,20-dione 21-hemisuccinate.

References Cited in the file of this patent
UNITED STATES PATENTS

| | | |
|---|---|---|
| 2,781,366 | Schneider | Feb. 12, 1957 |
| 2,841,600 | Hogg et al. | July 1, 1958 |
| 2,897,218 | Sebek et al. | July 28, 1959 |
| 2,980,670 | Berg et al. | Apr. 18, 1961 |
| 3,016,392 | Magerlein et al. | Jan. 9, 1962 |

OTHER REFERENCES

Spero et al.: "J.A.C.S." (1957) vol. 79, pages 1515–16.